United States Patent [19]

Agano

[11] Patent Number: 5,111,044
[45] Date of Patent: May 5, 1992

[54] MEDICAL IMAGE REPRODUCING SYSTEM
[75] Inventor: Toshitaka Agano, Kanagawa, Japan
[73] Assignee: Fuji Photo Film Co., Ltd., Kanagawa, Japan
[21] Appl. No.: 682,179
[22] Filed: Apr. 9, 1991
[30] Foreign Application Priority Data
  Apr. 10, 1990 [JP] Japan .................... 2-94650
[51] Int. Cl.⁵ .................... G01N 23/04; G06F 15/42; H04N 1/21
[52] U.S. Cl. .................... 250/327.2; 364/413.13; 358/462; 358/453; 346/33 ME; 346/108
[58] Field of Search .................... 250/327.2, 484.1; 358/462, 453; 346/33 ME, 108; 364/413.13

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 250/337 |
| 4,387,428 | 6/1983 | Ishida et al. | 250/337 |
| 4,739,480 | 4/1988 | Oono et al. | 378/165 |
| 4,789,782 | 12/1988 | Ohara | 250/327.2 |
| 4,924,321 | 5/1990 | Miyagawa et al. | 346/108 |
| 4,958,283 | 9/1990 | Tawara et al. | 364/413.13 |
| 5,001,569 | 3/1991 | Shiguo | 358/296 |

FOREIGN PATENT DOCUMENTS 56-11395 2/1981 Japan .................... 250/327.2

OTHER PUBLICATIONS

"Salient Characteristics of Distributed Diagnostic Imaging Management System for a Radiology Department", Dwyer et al, SPIE, vol. 318, pp. 194-204 (1982).

Primary Examiner—Carolyn E. Fields
Assistant Examiner—Drew A. Dunn
Attorney, Agent, or Firm—Sughrue, Mion, Zinn, Macpeak & Seas

[57] ABSTRACT

A medical image reproducing system comprises a plurality of medical image signal feeding apparatuses, which feed out image signals representing medical images, and a single image reproducing and recording apparatus, which is connected to the plurality of the medical image signal feeding apparatuses, and which reproduces an image from each of the image signals fed out from the medical image signal feeding apparatuses and records the image. Each medical image signal feeding apparatus is provided with a device for generating an identification signal representing the resolution, with which the picture elements in an image represented by an image signal fed out from each medical image signal feeding apparatus are arrayed. The identification signal is fed into the image reproducing and recording apparatus together with the corresponding image signal. The image reproducing and recording apparatus is provided with a device for reading an identification signal and setting the resolution, with which the picture elements in a reproduced and recorded image are arrayed, to be equal to the resolution represented by the identification signal, which has thus been read.

9 Claims, 2 Drawing Sheets

MEDICAL IMAGE REPRODUCING SYSTEM

BACKGROUND OF THE INVENTION

1. Field of the Invention

This invention relates to a system for reproducing medical images from image signals received from medical image signal feeding apparatuses, such as a computed radiography apparatus (CR apparatus) and an X-ray computed tomography scanner (X-ray CT scanner). This invention particularly relates to a medical image reproducing system wherein a single image reproducing and recording apparatus is used for a plurality of medical image signal feeding apparatuses.

2. Description of the Prior Art

Recently, in medical diagnosis facilities or medical research facilities, such as hospitals, reconstructed medical images of objects, such as projected images and tomographic images, are widely utilized in carrying out diagnoses or research. Image signals representing such medical images are fed out from various types of medical image signal feeding apparatuses, for example, CR apparatuses, X-ray CT scanners, magnetic resonance imaging apparatuses (MRI apparatuses), and ultrasonic diagnosis apparatuses. Image signals representing medical images are also fed out from image filing apparatuses for storing medical image signals, which have been received from such medical image signal feeding apparatuses, on storage media, such as optical disks In a large-scale hospital, ordinarily, a plurality of medical image signal feeding apparatuses are utilized.

By way of example, image signals, which have been fed out from medical image signal feeding apparatuses, are fed into an image reproducing and recording apparatus, such as a light beam scanning recording apparatus for scanning, for example, a photographic material with a light beam and recording an image, or into a CRT display device. The image signals are used in recording or displaying medical images as visible images.

In general, image reproducing and recording apparatuses, such as light beam scanning recording apparatuses, are more expensive than CRT display devices. Therefore, in cases where a plurality of medical image signal feeding apparatuses are utilized in a hospital, or the like, a single image reproducing and recording apparatus is utilized for the plurality of the medical image signal feeding apparatuses.

However, in general, the resolution, with which the picture elements in the image represented by an image signal fed out from a medical image signal feeding apparatus are arrayed, varies for different types and different manufacturers of medical image signal feeding apparatuses. (For example, the resolution is set to 10 pixels/mm in some medical image signal feeding apparatuses, and to 12.5 pixels/mm in others.) On the other hand, in general, in an image reproducing and recording apparatus, such as a light beam scanning recording apparatus, the resolution, with which the picture elements in a reproduced and recorded image are arrayed, is fixed. Such an image reproducing and recording apparatus cannot be utilized directly for all of a plurality of medical image signal feeding apparatuses among which the resolution, with which the picture elements in the image represented by an image signal fed out from a medical image signal feeding apparatus are arrayed, varies.

An image reproducing and recording apparatus, e.g. a light beam scanning recording apparatus, has been proposed wherein the resolution, with which the picture elements in a reproduced and recorded image are arrayed, can be changed in accordance with the scale of image enlargement or reduction. In cases where such an image reproducing and recording apparatus is used, the resolution, with which the picture elements in a reproduced and recorded image are arrayed, can be changed in accordance with the medical image signal feeding apparatus used. Therefore, a single such image reproducing and recording apparatus can be utilized commonly for a plurality of medical image signal feeding apparatuses among which the resolution, with which the picture elements in the image represented by an image signal fed out from a medical image signal feeding apparatus are arrayed, varies.

However, in such cases, considerable time and labor are required to change the resolution, with which the picture elements in a reproduced and recorded image are arrayed, in the image reproducing and recording apparatus by selecting a scale of image enlargement or reduction in accordance with the medical image signal feeding apparatus used.

SUMMARY OF THE INVENTION

The primary object of the present invention is to provide a medical image reproducing system, wherein a single image reproducing and recording apparatus is utilized commonly for a plurality of medical image signal feeding apparatuses among which the resolution, with which the picture elements in the image represented by an image signal fed out from a medical image signal feeding apparatus are arrayed, varies, and wherein no troublesome operation is required to utilize the image reproducing and recording apparatus commonly.

Another object of the present invention is to provide a medical image reproducing system, with which the efficiency of medical diagnoses and research using medical images can be kept high.

The present invention provides a medical image reproducing system, which comprises:

i) a plurality of medical image signal feeding apparatuses, which feed out image signals representing medical images, and ii) a single image reproducing and recording apparatus, which is connected to the plurality of said medical image signal feeding apparatuses, and which reproduces an image from each of the image signals fed out from the plurality of said medical image signal feeding apparatuses and records the image, wherein each of the plurality of said medical image signal feeding apparatuses is provided with a means for generating an identification signal representing the resolution, with which the picture elements in an image represented by an image signal fed out from each said medical image signal feeding apparatus are arrayed, said identification signal being fed into said image reproducing and recording apparatus together with the corresponding image signal, and said image reproducing and recording apparatus is provided with a means for reading an identification signal and setting the resolution, with which the picture elements in a reproduced and recorded image are arrayed, to be equal to the resolution of picture elements represented by the identification signal, which has thus been read.

With the medical image reproducing system in accordance with the present invention, the identification signal representing the resolution, with which the picture elements in an image represented by an image signal fed out from each medical image signal feeding apparatus are arrayed, is fed from each of the plurality of the medical image signal feeding apparatuses into the image reproducing and recording apparatus together with the corresponding image signal. In the image reproducing and recording apparatus, the resolution, with which the picture elements in a reproduced and recorded image are arrayed, is selected in accordance with the identification signal. Therefore, when an image signal is received from each of the plurality of the medical image signal feeding apparatuses, the resolution, with which the picture elements in a reproduced and recorded image are arrayed, can be automatically set to a value adapted for the medical image signal feeding apparatus, from which said image signal has been received. Accordingly, the operator of the image reproducing and recording apparatus need not carry out particular operations for selecting the resolution, with which the picture elements in a reproduced and recorded image are arrayed.

As described above, with the medical image reproducing system in accordance with the present invention, in the image reproducing and recording apparatus, the resolution, with which the picture elements in a reproduced and recorded image are arrayed, is changed in accordance with the identification signal received from each of the plurality of the medical image signal feeding apparatuses. Therefore, a single image reproducing and recording apparatus can be utilized commonly for a plurality of medical image signal feeding apparatuses among which the resolution, with which the picture elements in the image represented by an image signal fed out from a medical image signal feeding apparatus are arrayed, varies. No troublesome operation is required to utilize the image reproducing and recording apparatus commonly. Accordingly, with the medical image reproducing system in accordance with the present invention, the efficiency of medical diagnoses and research using medical images can be kept high.

DESCRIPTION OF THE PREFERRED EMBODIMENTS

The present invention will hereinbelow be described in further detail with reference to the accompanying drawings.

Figure 1:
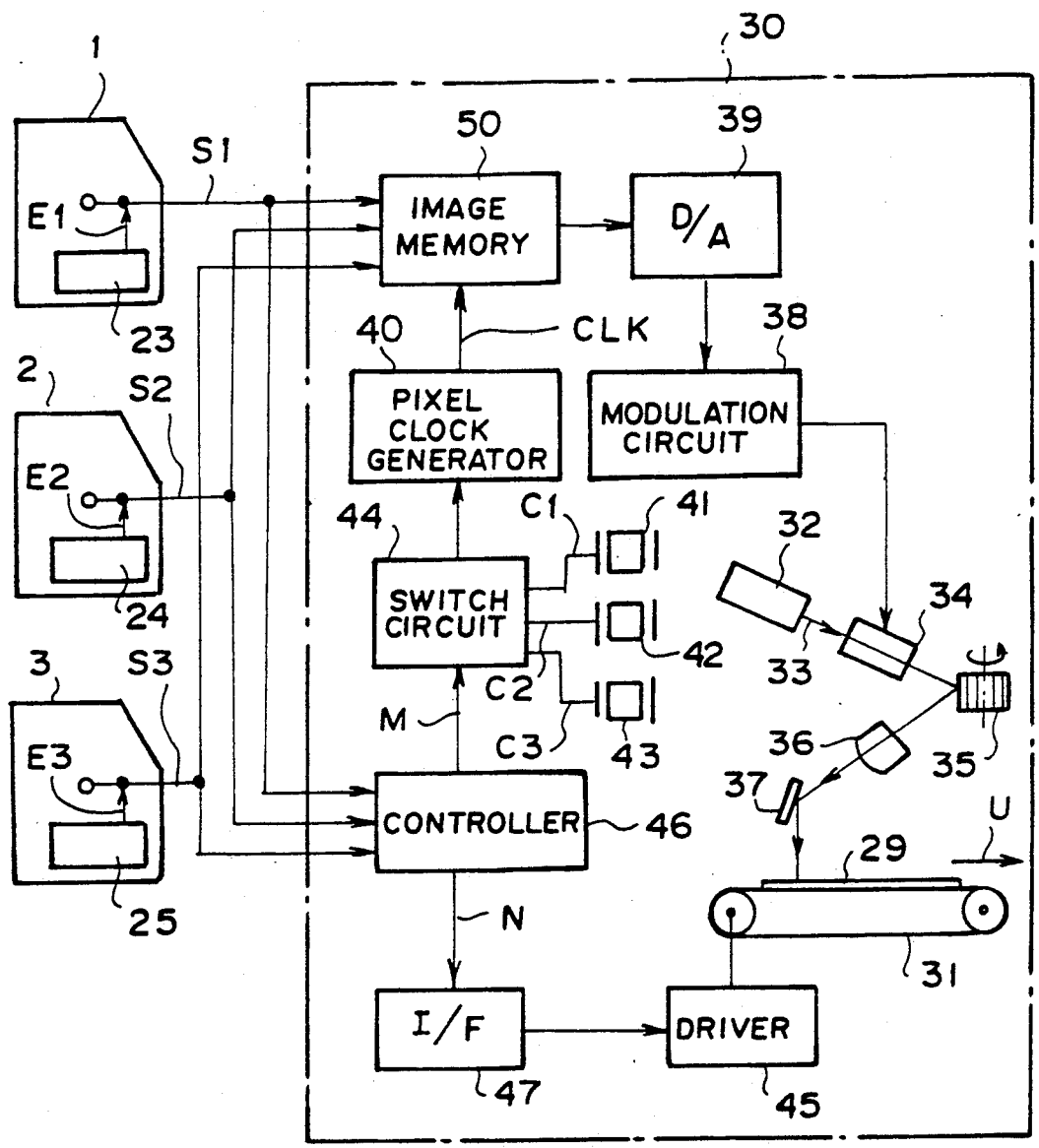
FIG. 1 is a schematic view showing an embodiment of the medical image reproducing system in accordance with the present invention.

FIG. 1 is a schematic view showing an embodiment of the medical image reproducing system in accordance with the present invention. A radiation image read-out apparatus 1, an X-ray CT scanner 2, and an ultrasonic diagnosis apparatus 3 serve as medical image signal feeding apparatuses. These medical image signal feeding apparatuses are connected to a light beam scanning recording apparatus 30, which serves as an image reproducing and recording apparatus.

The radiation image read-out apparatus 1 will be described hereinbelow with reference to FIG. 2. In the radiation image read-out apparatus 1, a radiation image is read out from a stimulable phosphor sheet, on which the radiation image has been stored. Stimulable phosphor sheets are described in, for example, U.S. Pat. Nos. 4,258,264, 4,276,473, 4,315,318 and 4,387,428 and Japanese Unexamined Patent Publication No. 56(1981)-11395.

Figure 2:
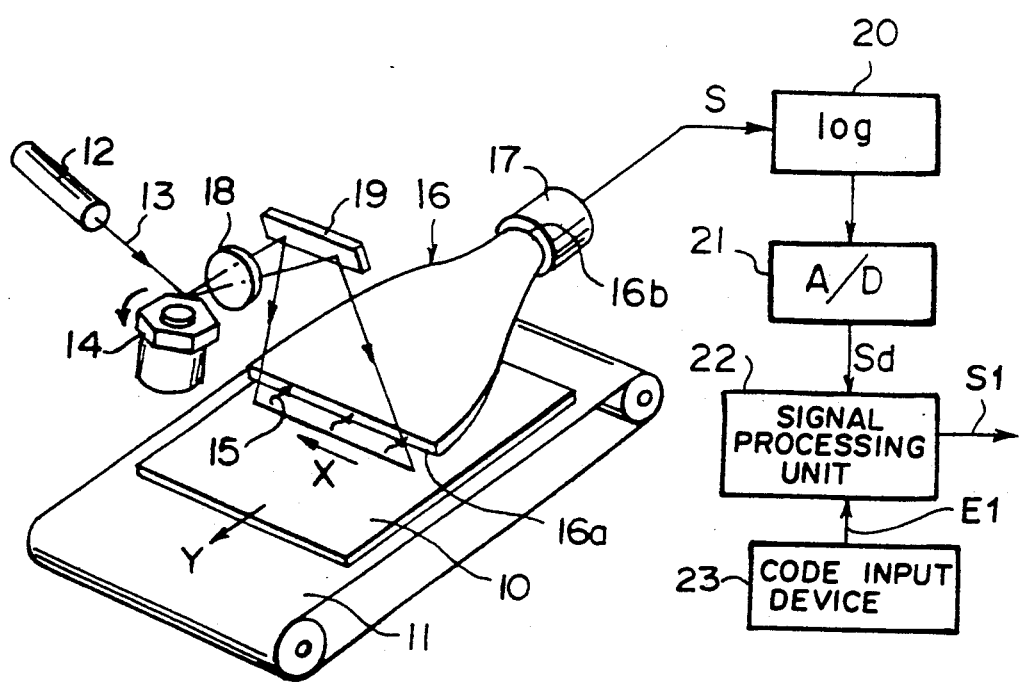
FIG. 2 is a schematic perspective view showing a radiation image read-out apparatus in the embodiment of FIG. 1.

With reference to FIG. 2, a stimulable phosphor sheet 10 has been exposed to radiation, such as X-rays, which has passed through an object. A radiation image of the object has thereby been stored on the stimulable phosphor sheet 10. The stimulable phosphor sheet 10, on which the radiation image has been stored, is then conveyed in a sub-scanning direction indicated by the arrow Y by a sheet conveyance means 11. The sheet conveyance means 11 may be constituted of an endless belt, or the like. A laser beam 13, which serves as stimulating rays, is produced by a laser beam source 12, and is deflected by a rotating polygon mirror 14 which is rotated quickly. The laser beam 13 is then converged by a converging lens 18, which is ordinarily constituted of an fθ lens. Thereafter, the laser beam 13 is reflected by a mirror 19, and is caused to scan the stimulable phosphor sheet 10 in a main scanning direction indicated by the arrow X, which direction is approximately normal to the sub-scanning direction indicated by the arrow Y.

When the stimulable phosphor sheet 10 is exposed to the laser beam 13, the exposed portion of the stimulable phosphor sheet 10 emits light 15 in an amount proportional to the amount of energy stored thereon during its exposure to the radiation. The emitted light 15 is guided by a light guide member 16 and photoelectrically detected by a photomultiplier 17, which serves as a photodetector. The light guide member 16 is made from a light guiding material such as an acrylic plate and has a linear light input face 16a, positioned so that it extends along the main scanning line on the stimulable phosphor sheet 10, and a ring-shaped light output face 16b, positioned so that it is in close contact with a light receiving face of the photomultiplier 17. The emitted light 15, which has entered the light guide member 16 at its light input face 16a, is guided through repeated total reflection inside of the light guide member 16, emanates from the light output face 16b, and is received by the photomultiplier 17. In this manner, the amount of the emitted light 15, which amount represents the radiation image, is converted into an electric signal by the photomultiplier 17.

In the manner described above, an analog output signal (image signal) S is generated by the photomultiplier 17. The analog output signal S is amplified by a logarithmic amplifier 20 and is then digitized into a digital image signal Sd with a predetermined scale factor in an A/D converter 21. The digital image signal Sd thus obtained is fed into a signal processing unit 22, which carries out signal processing (i.e. image processing), such as gradation processing and frequency response processing, on the digital image signal Sd.

In this embodiment, the resolution, with which the image information stored on the stimulable phosphor sheet 10 is read out, is set to 10 pixels/mm. Therefore, the image signal Sd obtained from the image read-out operation represents a radiation image in which the picture elements are arrayed with a resolution of 10 pixels/mm. The signal processing unit 22 is connected to a code input device 23 and receives a digital code signal E1 therefrom. The digital code signal E1 represents the resolution, with which the picture elements in the image represented by the image signal Sd are arrayed. The image signal Sd, which has been obtained from the image processing, and the code signal E1 are fed together into the light beam scanning recording apparatus 30.

In cases where the resolution, with which the image information stored on a stimulable phosphor sheet 10 is read out, is changed or processing for decreasing the resolution, with which the picture elements in the image represented by the image signal Sd are arrayed, is carried out on the image signal Sd, the code signal E1 is changed automatically or by operating the code input device 23.

As illustrated in FIG. 1, the X-ray CT scanner 2 and the ultrasonic diagnosis apparatus 3 are also provided with code input devices 24 and 25, which act in the same manner as that in the code input device 23. From the X-ray CT scanner 2, a digital image signal S2 and a code signal E2 are fed out together with each other. Also, from the ultrasonic diagnosis apparatus 3, a digital image signal S3 and a code signal E3 are fed out together with each other.

The resolution, with which the picture elements in the image represented by the image signal S2 fed out from the X-ray CT scanner 2 are arrayed, is set to, for example, 12.5 pixels/mm. Also, the resolution, with which the picture elements in the image represented by the image signal S3 fed out from the ultrasonic diagnosis apparatus 3 are arrayed, is set to, for example, 8 pixels/mm. These resolution values are different from the resolution, with which the picture elements in the image represented by the image signal S1 fed out from the radiation image read-out apparatus 1 are arrayed.

The light beam scanning recording apparatus 30 will hereinbelow be described with reference to FIG. 1. A sheet of photographic film 29 is conveyed by a film conveyance means 31, which may be constituted of and endless belt, or the like, in a sub-scanning direction indicated by the arrow U. A laser beam 33, which serves as recording light, is produced by a laser beam source 32. The laser beam 33 passes through a light modulator 34, which may be constituted of an acousto-optic modulator (AOM), or the like. Thereafter, the laser beam 33 is deflected by a rotating polygon mirror 35, which rotates quickly. The laser beam 13 is then converged by a converging lens 36, which is ordinarily constituted of an fθ lens. Thereafter, the laser beam 13 is reflected by a mirror 37, and is caused to scan the photographic film 29 in a main scanning direction, which direction is approximately normal to the sub-scanning direction indicated by the arrow U.

The light modulator 34, which modulates the laser beam 33, is controlled by a modulation circuit 38. The image signal S1, S2, or S3 is temporarily stored in an image memory 50 and thereafter read therefrom with a predetermined access speed. The image signal S1, S2, or S3 is then converted by a D/A converter 39 into an analog signal. The modulation circuit 38 receives the analog signal, and controls the light modulator 34 in accordance with the analog signal. In this manner, the laser beam 33 is modulated in accordance with the image signal S1, S2, or S3. The photographic film 29 is scanned with the modulated laser beam 33, and image represented by the image signal S1, S2, or S3 is thereby recorded as a photographic latent image on the photographic film 29.

Thereafter, the photographic film 29, on which the photographic latent image has been recorded, is sent to a developing apparatus (not shown). In the developing apparatus, the photographic latent image is developed, and the medical image, such as a radiation image or a tomographic image, is reproduced as a visible image.

The image memory 50 receives a pixel clock signal CLK from a pixel clock signal generator 40. The pixel clock signal CLK determines the period, with which the image signal is read from the image memory 50, i.e the period with which the image information corresponding to a single picture element is written. The pixel clock signal generator 40 is connected to a switching circuit 44, which is in turn connected to reference clock signal generators 41, 42, and 43 for generating reference clock signals C1, C2, and C3. One of the reference clock signals C1, C2, and C3 is selectively fed into the pixel clock signal generator 40. The frequency of the pixel clock signal CLK is determined by one of the reference clock signals C1, C2, and C3, which differ in their frequency. The film conveyance means 31 is controlled by an drive circuit 45, such that the speed, with which the photographic film 29 is conveyed, can be varied.

The image signal S1, S2, or S3 is also fed into a controller 46, which may be constituted of a microcomputer, or the like. The controller 46 reads the code signal E1, E2, or E3, which is received together with the image signal S1, S2, or S3. Thereafter, the controller 46 feeds a switching instruction signal M to the switching circuit 44 in accordance with the code signal E1, E2, or E3, which has been read. The switching circuit 44 is operated by the switching instruction signal M so as to feed the reference clock signal C1, C2, or C3 into the pixel clock signal generator 40. The controller 46 also generates a sub-scanning speed instructing signal N in accordance with the code signal E1, E2, or E3. The sub-scanning speed instructing signal N is fed into an interface 47 and then into the drive circuit 45. In this manner, the speed, with which the photographic film 29 is conveyed by the film conveyance means 31, is changed in accordance with the code signal E1, E2, or E3.

In the manner described above, the frequency of the pixel clock signal CLK and the speed, with which the photographic film 29 is scanned with the laser beam 33 in the sub-scanning direction, are changed when a visible image is reproduced from the image signal S1 fed out from the radiation image read-out apparatus 1, when a visible image is reproduced from the image signal S2 fed out from the X-ray CT scanner 2, and when a visible image is reproduced from the image signal S3 fed out from the ultrasonic diagnosis apparatus 3. In each case, the resolution, with which the picture elements in a reproduced and recorded image are arrayed, is set to be equal to the resolution which is represented by the code signal E1, E2, or E3.

In the embodiment described above, the resolution, with which the picture elements in a reproduced and recorded image are arrayed, is changed by changing the frequency of the pixel clock signal CLK and the speed, with which the photographic film 29 is scanned with the laser beam 33 in the sub-scanning direction. Alternatively, said resolution may be changed by changing the speed, with which the photographic film 29 is scanned with the laser beam 33 in the main scanning direction (i.e. the speed at which the rotating polygon mirror 35 rotates), and the speed, with which the photographic film 29 is scanned with the laser beam 33 in the sub-scanning direction. As another alternative, said resolution may be changed by changing the frequency of the pixel clock signal CLK and the speed, with which the photographic film 29 is scanned with the laser beam 33 in the main scanning direction. As a further alternative, said resolution may be changed by changing all of the frequency of the pixel clock signal CLK, the speed, with which the photographic film 29 is scanned with the laser beam 33 in the main scanning direction, and the speed, with which the photographic film 29 is scanned with the laser beam 33 in the sub-scanning direction.

In cases where the resolution, with which the picture elements in a reproduced and recorded image are arrayed, is changed in the same manner as that in the aforesaid embodiment, a rotating polygon mirror, whose rotation speed cannot easily be varied, can be utilized as the means for scanning the photographic film 29 with the recording light in the main scanning direction. In cases where the speed, with which the photographic film 29 is scanned with the laser beam 33 in the main scanning direction, and the speed, with which the photographic film 29 is scanned with the laser beam 33 in the sub-scanning direction, are changed, the access speed can be kept constant in the course of reading the image signals from the image memory 50. In cases where the frequency of the pixel clock signal CLK and the speed, with which the photographic film 29 is scanned with the laser beam 33 in the main scanning direction, are changed, the speed, with which a visible image is reproduced and recorded, can be kept constant.

I claim:

1. A medical image reproducing system, which comprises:
   i) a plurality of medical image signal feeding apparatuses, which feed out image signals representing, medical images, and
   ii) a single image reproducing and recording apparatus, which is connected to the plurality of said medical image signal feeding apparatuses, and which reproduces an image from each of the image signals fed out from the plurality of said medical image signal feeding apparatuses and records the image,
   wherein each of the plurality of said medical image signal feeding apparatuses is provided with means for generating an identification signal representing the resolution, with which the picture elements in an image represented by an image signal fed out from each said medical image signal feeding apparatus are arrayed, said identification signal being fed into said image reproducing and recording apparatus together with the corresponding image signal, and
   said image reproducing and recording apparatus is provided with a means for reading the identification signal and setting the resolution, with which the picture elements in a reproduced and recorded image are arrayed, to be equal to the resolution represented by the identification signal, which has thus been read.

2. A system as defined in claim 1 wherein said medical images include a radiation image stored on a stimulable phosphor sheet.

3. A system as defined in claim 1 wherein said image reproducing and recording apparatus is a light beam scanning recording apparatus, in which a recording material is scanned with a light beam modulated in accordance with an image signal and an image represented by the image signal is thereby recorded on the recording material.

4. A system as defined in claim 3 wherein the resolution, with which the picture elements in a reproduced and recorded image are arrayed, is changed in accordance with the identification signal by changing:
   a) the frequency of a pixel clock signal for determining the period, with which the image information corresponding to a single picture element is written, and
   b) the speed, with which the recording material is scanned with the light beam in a sub-scanning direction.

5. A system as defined in claim 3 wherein the resolution, with which the picture elements in a reproduced and recorded image are arrayed, is changed in accordance with the identification signal by changing:
   a) the speed, with which the recording material is scanned with the light beam in a main scanning direction, and
   the speed, with which the recording material is scanned with the light beam in a sub-scanning direction.

6. A system as defined in claim 3 wherein the resolution, with which the picture elements in a reproduced and recorded image are arrayed, is changed in accordance with the identification signal by changing:
   a) the frequency of a pixel clock signal for determining the period, with which the image information corresponding to a single picture element is written, and
   b) the speed, with which the recording material is scanned with the light beam in a main scanning direction.

7. A system as defined in claim 3 wherein the resolution, with which the picture elements in a reproduced and recorded image are arrayed, is changed in accordance with the identification signal by changing:
   a) the frequency of a pixel clock signal for determining the period, with which the image information corresponding to a single picture element is written,
   b) the speed, with which the recording material is scanned with the light beam in a main scanning direction, and
   c) the speed, with which the recording material is scanned with the light beam in a sub-scanning direction.

8. A system as defined in claim 3 wherein said light beam is a laser beam.

9. A medical image reproducing system comprising:
   a plurality of medical image signal feed apparatuses which feed out image signals representing medical images, each of said medical image feeding apparatuses having a corresponding resolution falling within a predetermined resolution range;
   a plurality of code generators, each of said generators being operatively coupled to a corresponding one of said medical image signal feeding apparatuses so as to provide an information signal indicative of image signal resolution for each of said image signals fed out by said medical image feeding apparatuses; and
   an image reproducing and recording apparatus having a resolution corresponding to said predetermined resolution range which is operatively coupled to said medical image feeding apparatuses and said generators so as to receive a selected one of said image signals and a corresponding said identification code and record an image, said image reproducing and recording apparatus including a controller providing at least one instruction signal which sets at least one of a pixel clock frequency, a sub-scanning speed and a main scanning speed so as to permit said image reproducing and recording apparatus to record the image responsive to the resolution representing picture elements arrayed in the image provided by the corresponding said identification signal.

* * * * *